US012573956B2

(12) United States Patent
Wijekoon et al.

(10) Patent No.: US 12,573,956 B2
(45) Date of Patent: Mar. 10, 2026

(54) CONVERTER FOR POWER CONVERSION, THREE-PHASE CONVERTER ARRANGEMENT AND METHOD FOR PACKAGING A CONVERTER

(71) Applicant: Huawei Technologies Co., Ltd., Shenzhen (CN)

(72) Inventors: Piniwan Thiwanka Bandara Wijekoon, Nuremberg (DE); Sebastian Rosado, Nuremberg (DE); Zhaohui Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 18/496,212

(22) Filed: Oct. 27, 2023

(65) Prior Publication Data

US 2024/0055993 A1 Feb. 15, 2024

Related U.S. Application Data

(63) Continuation of application No. PCT/CN2021/091183, filed on Apr. 29, 2021.

(51) Int. Cl.
| | |
|---|---|
| *H02M 3/158* | (2006.01) |
| *H02M 1/00* | (2006.01) |
| *H02M 1/088* | (2006.01) |

(52) U.S. Cl.
CPC ....... *H02M 3/1584* (2013.01); *H02M 1/0048* (2021.05); *H02M 1/088* (2013.01)

(58) Field of Classification Search
CPC .......... H02M 5/40; H02M 5/42; H02M 5/453; H02M 7/7575; H02M 5/458; H02M 5/45;
(Continued)

(56) References Cited

U.S. PATENT DOCUMENTS

| | | | |
|---|---|---|---|
| 3,586,917 A | 6/1971 | Oates | |
| 5,093,713 A * | 3/1992 | Sawaya | ............... H01L 23/4334 |
| | | | 257/E23.092 |

(Continued)

FOREIGN PATENT DOCUMENTS

| | | |
|---|---|---|
| CN | 108092536 A | 5/2018 |
| CN | 111130361 A | 5/2020 |

(Continued)

OTHER PUBLICATIONS

Qing-Xin Guan et al., "An Extremely High Efficient Three-Level Active Neutral-Point-Clamped Converter Comprising SiC and Si Hybrid Power Stages," vol. 33, No. 10, XP11687290A, 12 pages.

(Continued)

*Primary Examiner* — Jeffrey A Gblende
(74) *Attorney, Agent, or Firm* — Conley Rose, P.C.

(57) ABSTRACT

A converter comprises a first circuit part and a second circuit part configured to be electrically connected with each other. Each circuit part comprises two or more switches configured to be switched for the power conversion, the switches being semiconductor switches. The two or more switches of the first circuit part are configured for a first switching operation of the first circuit part. The two or more switches of the second circuit part are configured for a second switching operation of the second circuit part. The first switching operation causes a greater electrical power loss compared to the second switching operation. The two circuit parts are configured such that the first circuit part is configured to operate at a higher operating temperature compared to the second circuit part.

20 Claims, 8 Drawing Sheets

(58) Field of Classification Search
CPC .. H02M 5/4585; H02M 5/4505; H02M 5/451;
H02M 5/452; H02M 5/447; H02M 5/456;
H02M 1/12; H02M 1/4266; H02M
2001/123; H02M 7/53; H02M 7/537;
H02M 7/5387; H02M 7/53871; H02M
7/53873; H02M 7/53875; H02M 7/53876;
H02M 1/10; H02M 3/33561; H02M
7/003; H02M 1/088; H02M 3/088; H02M
3/1584; H02M 3/1566; H02M 1/084;
H02M 3/003; H02M 3/33523; H02H
7/261; H02H 7/268; H02J 3/36; H02J
3/01; G06F 1/263; H01L 25/112; H01L
25/115; H01L 23/34; H01L 23/528; H01L
27/088; H01L 29/088; H01L 29/2003;
H01L 23/49503; H01L 23/49562; H01L
23/49575; H01L 23/62; H01L 23/072;
H01L 23/0248; H01L 29/1033; H01L
29/402; H01L 29/41758; H01R 13/6675;
H01R 29/00; H01R 31/065; G09G 3/20;
H02K 11/046; H01F 2027/406; H01F
27/30; H01F 41/0246; H05K 7/20927;
H05K 2201/10166; H05K 2201/10507;
H05K 7/2089
See application file for complete search history.

(56) References Cited

U.S. PATENT DOCUMENTS

| | | | | |
|---|---|---|---|---|
| 8,120,153 | B1 | 2/2012 | Shen | |
| 9,602,011 | B1 * | 3/2017 | Baker | H02M 3/33507 |
| 10,110,120 | B2 * | 10/2018 | Høyerby | H02M 3/07 |
| 11,418,141 | B2 * | 8/2022 | Krug | H02M 5/4585 |
| 11,810,775 | B2 * | 11/2023 | Lin | H01L 23/4334 |

FOREIGN PATENT DOCUMENTS

| | | |
|---|---|---|
| CN | 112532081 A | 3/2021 |
| DE | 202017101996 U1 | 4/2018 |
| JP | 2014036509 A | 2/2014 |
| JP | 2017103380 A | 6/2017 |
| KR | 20140078175 A | 6/2014 |
| WO | 2020239421 A1 | 12/2020 |

OTHER PUBLICATIONS

Kehl Zdenek et al: "Analysis of three-level neutral point piloted power converter topology", 2018 International Conference on Applied Electronics (AE), University of West Bohemia. Sep. 11, 2018, XP033423780, total 4 pages.

* cited by examiner

A1          A2          A3          A4

B1          B2          B3          B4          B5

IN1

1, M1

SC1

S11

N1

D1

S3

C1

S12

2, M2

BS

S6

IN3        OUT

S5

SC2

S22

C2

D2

S4

N2

S21

1, M1

IN2

Figure 8:
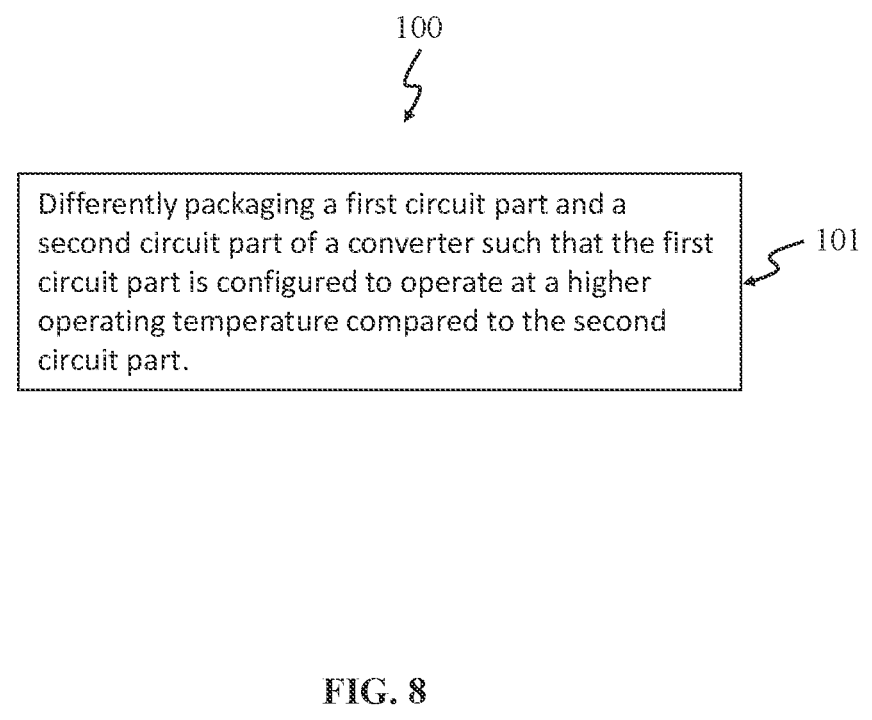

100

Differently packaging a first circuit part and a
second circuit part of a converter such that the first
circuit part is configured to operate at a higher
operating temperature compared to the second
circuit part.

CONVERTER FOR POWER CONVERSION, THREE-PHASE CONVERTER ARRANGEMENT AND METHOD FOR PACKAGING A CONVERTER

CROSS-REFERENCE TO RELATED APPLICATIONS

This is a continuation of International Patent Application No. PCT/CN2021/091183 filed on Apr. 29, 2021, the disclosure of which is hereby incorporated by reference in its entirety.

TECHNICAL FIELD

The disclosure relates to a converter for power conversion, a three-phase converter arrangement comprising at least one such converter, and a method for packaging a converter.

BACKGROUND

The disclosure is in the field of converters, which may also be referred to as power converters. Such converters may correspond to direct current (DC)-to-alternating current (AC) converters (also known as inverters respectively power inverters) or AC-to-DC converters. DC-to-AC converters and AC-to-DC converters may be used in several applications such as electrical drivers, electrical vehicle (EV) charging etc.

SUMMARY

Embodiments of the disclosure are based on the following considerations.

Circuits for implementing a power converter may be based on two-level and multi-level circuit topologies of various types. Such converters may be used for implementing the phase legs of a three-phase converter arrangement, such as a three-phase DC-to-AC converter arrangement (also known as three-phase DC-to-AC inverter arrangement). Voltage source type, two-level circuits are the most simple and robust solution, but present some limitations in terms of performance, especially in terms of relatively high power loss (may also be referred to as power loss dissipation) and undesirable harmonic current injection into the grid. The high power loss brings not only the issue of low efficiency, but also requires large size heat-dissipation components. The high harmonic distortion challenges the compatibility of the converter connection to the grid and requires using bulky grid connection filters. These items produce equipment with large volume and weight, and low power density.

Power semiconductor devices based on wide bandgap (WBG) semiconductor materials, such as silicon carbide (SiC) or gallium nitride (GaN), may improve efficiency and the overall performance of power converters, as compared to silicon (Si) based semiconductor devices. However, the still high cost of WBG semiconductor devices prevents their widespread use in many applications, such as in solar photo-voltaic (PV) applications.

In view of the above disadvantages and drawbacks, embodiments of the disclosure aim to provide a converter that overcomes at least one of the above described disadvantages and drawbacks. An object may be to provide a converter for power conversion that allows improving at least one of efficiency of the converter, the overall performance of the converter and costs for implementing the converter. In particular, an objective may be to provide a converter for power conversion that is improved with regard to implementation costs without a negative effect (reduction) on the performance of the converter.

The objective is achieved by the embodiments of the disclosure as described in the enclosed independent claims. Advantageous implementations of the embodiments of the disclosure are further defined in the dependent claims.

A first aspect of the disclosure provides a converter for power conversion, the converter comprising a first circuit part and a second circuit part that are configured to be electrically connected with each other. Each circuit part of the first circuit part and the second circuit part comprises two or more switches configured to be switched for the power conversion, wherein the switches are semiconductor switches. The two or more switches of the first circuit part are configured for a first switching operation of the first circuit part. The two or more switches of the second circuit part are configured for a second switching operation of the second circuit part. The first switching operation causes a greater electrical power loss compared to the second switching operation. The first circuit part and the second circuit part are configured such that the first circuit part is configured to operate at a higher operating temperature compared to the second circuit part. The first circuit part may correspond to a first module and the second circuit part may correspond to a second module of the converter.

Since the first circuit part is configured to operate at a higher operating temperature compared to the second circuit part, the first circuit may be configured to deal with the greater electrical power loss caused by the first switching operation, when the first circuit part is operated according to the first switching operation. Since the second circuit part is configured to operate at a lower operating temperature compared to the first circuit part, the second circuit part may be implemented by electrical elements, in particular semiconductor switches, and materials that are suitable for lower temperatures compared to those of the first circuit part. Such electrical elements and materials for lower temperatures are cheaper and, thus, improve costs of implementing the converter.

In other words, the disclosure proposes to split the converter into a first circuit part comprising two or more switches and a second circuit part comprising two or more switches, wherein the switches of the first circuit part are configured for a first switching operation that causes a greater electrical power loss compared to a second switching operation for which the switches of the second circuit part are configured for. In addition, the first circuit part and the second circuit part are configured such that the first circuit part is configured to operate at a higher operating temperature compared to the second circuit part. Thus, the converter may operate at the higher operating temperature, while not the whole converter is configured for the higher operating temperature. As a result, the second circuit part may be implemented using electric elements, in particular semiconductor switches, and materials that are suitable (respectively configured) for lower temperatures and, thus are cheaper. Therefore, the converter according to the first aspect allows reducing the implementation costs without effecting, in particular reducing, the performance of the converter.

The term "power converter" may be used as a synonym for the term "converter". The converter may be an AC-to-DC converter or a DC-to-AC converter (inverter respectively power inverter). The AC-to-DC converter is configured to converter AC power to DC power. The DC-to-AC converter is configured to convert DC power to AC power. The converter may be configured for an inverter application, such as a solar PV inverter application. The converter may be configured to be used in a renewable energy device such as a PV device or wind energy device.

The first circuit part and the second circuit part may be electrically connected with each other. Further, the first circuit part and the second circuit part may be differently packaged such that the first circuit part is configured to operate at a higher operating temperature compared to the second circuit part. The term "electrically connect" may be abbreviated by the term "connect".

The terms "electrical power loss" and "electrical power dissipation" may be used as synonyms.

The term "electrical power loss" may be abbreviated as "power loss". The electrical power loss caused by a switching operation indicates or corresponds to the amount of electrical power respectively electrical energy that is converted, due to the switching operation, to thermal energy. Therefore, an increase in electrical power loss caused by a switching operation results in an increase in temperature at the circuit part that is operated according to the switching operation and vice versa.

In particular, the first switching operation causes an electrical power loss of the first circuit part that is greater than an electrical power loss of the second circuit part caused by the second switching operation, when the first switching operation of the first circuit part and the second switching operation of the second circuit part are performed for the power conversion. Performing the first switching operation corresponds to operating the first circuit part according to the first switching operation, i.e. switching the switches of the first circuit part according to the first switching operation. Performing the second switching operation corresponds to operating the second circuit part according to the second switching operation, i.e. switching the switches of the second circuit part according to the second switching operation.

The electrical power loss of a circuit part occurs during the conduction state as well as in switching states of the semiconductor switches of the circuit part. In particular, the first switching operation of the first circuit part causes greater switching losses compared to the second switching operation of the second circuit part. The switching losses caused by a switching operation may depend on the switching activity (i.e. the amount of switching events during a time period) and the time point of switching and, thus, conditions during the switching (e.g. hard switching conditions or soft switching conditions).

The first switching operation and the second switching operation may form the switching operation of the converter for power conversion.

The two or more switches of the first circuit part may be configured to be more often or more frequently switched compared to the two or more switches of the second circuit part during a time period. Thus, the two or more switches of the first circuit part may be configured for a greater switching activity compared to the two or more switches of the second circuit part. In other words, the two or more switches of the first circuit part may be configured for a first switching activity and the two or more switches of the second circuit part may be configured for a second switching activity, wherein the first switching activity is greater than the second switching activity. In particular, the two or more switches of the first circuit part may be configured to be switched with a greater frequency compared to the two or more switches of the second circuit part.

The switching activity of a circuit part comprising switches corresponds to the amount of switching events of the switches of the circuit part during a time period. Thus, the greater the switching activity of the circuit part, the greater the amount of switching events during the time period and vice versa. A switching event comprises a switch-on event and a switch-off event. During a switch on-event a switch is switched from the non-conducting state (off-state) to the conducting state (on-state), i.e. the switch is turned on. During a switch-off event a switch is switched from the conducting state (on-state) to the non-conducting state (off-state), i.e. the switch is turned off.

The switches of the converter may be configured for a switching operation, during which a switching activity of the switches of the first circuit part is smaller than or equal to a switching activity of the switches of the second circuit part and the electrical power loss of the first circuit part is greater compared to the electrical power loss of the second circuit part. In particular, the two or more switches of the first circuit part may be configured to be switched under "hard switching conditions" (in particular for most of the time), i.e. dissipating full switching losses. The two or more switches of the second circuit part may be configured to operate under "soft-switching conditions" (in particular for most of the time), i.e. dissipating a reduced amount of switching losses.

In an implementation form of the first aspect, the first circuit part and the second circuit part are packaged such that a first package material packages the first circuit part and a second package material packages the second circuit part, wherein the first package material is suitable for a higher operating temperature compared to the second package material.

Using the two package materials allows reducing the costs for implementing the converter, without a negative effect on the performance of the converter. Namely, since the second package material is used for the second circuit part (and not the first circuit part), the temperature characteristic of the second package material does not have an effect on the first circuit part of the converter. At the same time, using the first package material only for the first circuit part and not for the whole converter allows reducing the cost for implementing the converter, because package materials suitable for higher operating temperatures are more expensive compared to package materials suitable for lower operating temperatures. Using the first package material for the first circuit part allows the first switching operation of the first circuit part of the converter to be performed and thus, the packaging does not have a negative effect on the performance of the first circuit part and, thus, on the overall performance of the converter.

The first package material is configured to not change its material properties at the higher operating temperature. Thus, a package material being suitable for a temperature means that the package material does not change its material properties at that temperature. The first circuit part and the second circuit part may be configured such that the first circuit part is configured to operate at a first operating temperature and the second circuit part is configured to operate at a second operating temperature. The first operating temperature is higher respectively greater than the second operating temperature. The first package material is suitable for the first operating temperature, because the first package material is configured to not change its material properties in a first temperature range comprising the first operating temperature. The second package material is suitable for the second operating temperature, because the second package material is configured to not change its material properties in a second temperature range comprising the second operating temperature, but not the first operating temperature. That is, the first package material is suitable for operating temperatures for which the second package material is not suitable for, because the first package material does not change its material properties at these operating temperatures, whereas the second package material would change its material properties at these operating temperatures. In particular, the first package material may be suitable for a first temperature range and the second package material may be suitable for a second temperature range, wherein the first temperature range comprises temperatures that are greater than the temperatures of the second temperature range. The first temperature range may comprise the second temperature range.

According to an embodiment, the first package material may be suitable for temperatures smaller than or equal to 200° C. According to a further embodiment, the first package material may be suitable for temperatures smaller than or equal to 250° C. That is the first package material may be suitable for temperatures greater than 200° C. According to a further embodiment, the first package material may be suitable for temperatures smaller than or equal to 500° C. That is the first package material may be suitable for temperatures greater than 250° C. According to a further embodiment, the first package material may be suitable for temperatures greater than 500° C. The second package material may be suitable for temperatures smaller than or equal to 175° C. The terms "higher" and "greater" may be used as synonyms. The terms "lower" and "smaller" may be used as synonyms. Changes in material properties of a package material (e.g. the first package material or the second package material), may cause reliability and lifetime issues of the electrical elements packaged by the package material. The material properties of a package material may comprise or correspond to thermal properties and electrical properties of the package material.

The first package material may comprise or correspond to at least one ceramic material. The first package material may comprise or correspond to aluminium oxide ($Al_2O_3$), aluminium nitride (AlN), silicon nitride ($Si_3N_4$), or a combination thereof.

In an implementation form of the first aspect, the first circuit part is packaged in a first package comprising the first package material and the second circuit part is package in a second package comprising the second package material.

This implementation form has the same advantage, as outlined already above with regard to the implementation form regarding the two package materials.

In particular, the first package may be made of the first package material and the second package may be made of the second package material.

In an implementation form of the first aspect, the first circuit part and the second circuit part are packaged such that the first circuit part and the second circuit part are differently bonded.

In particular, the first circuit part and the second circuit part may be packaged such that the first circuit part is bonded according to a first bonding technique and the second circuit part is bonded according to a second bonding technique, wherein the first bonding technique is suitable for a higher operating temperature compared to the second bonding technique.

Differently bonding the two circuit parts, in particular using the two bonding techniques, allows reducing the costs for implementing the converter, without a negative effect on the performance of the converter. Namely, since the second bonding technique is used for the second circuit part (and not the first circuit part), the temperature characteristic of the second bonding technique does not have an effect on the first circuit part of the converter. At the same time, using the first bonding technique only for the first circuit part and not for the whole converter allows reducing the cost for implementing the converter, because bonding techniques suitable for higher operating temperatures may be more expensive compared to bonding techniques suitable for lower operating temperatures. Using the first bonding technique for the first circuit part allows the first switching operation of the first circuit part of the converter to be performed. Therefore, the first bonding technique does not have a negative effect on the performance of the first circuit part and, thus, on the overall performance of the converter.

In an implementation form of the first aspect, the first circuit part is bonded according to at least one sintering technique. The first circuit part may be bonded according to a double-sided sintering technique, a silver sintering technique or a combination thereof.

In an implementation form of the first aspect, the two or more switches of the first circuit part are wide bandgap semiconductor switches.

In other words, the two or more switches of the first circuit part may be made of one or more wide bandgap semiconductor materials. That is, a wide bandgap semiconductor switch is a semiconductor switch comprising or being made of at least one wide bandgap semiconductor material. The two or more switches of the first circuit part may be made of SiC and/or GaN.

Using wide bandgap semiconductor switches as the switches of the first circuit part has the advantage that the wide bandgap semiconductor switches improve efficiency and the performance of the first circuit part and thus, the overall performance of the converter. In addition, wide bandgap semiconductor switches have the capability to operate at high temperatures and, thus, are suitable for the first switching operation.

At least one switch, optionally all, of the two or more switches of the second circuit part may be silicon semiconductor switches. That is, at least one switch, optionally all, of the two or more switches of the second circuit part may be made of silicon.

This has the advantage of reducing the costs of implementing the second circuit part, e.g. compared to the case when all switches of the converter are implemented as wide bandgap semiconductor switches, without having a negative effect on the performance of the converter.

Thus, to alleviate the high cost of using wide bandgap semiconductor devices and still profit from the advantages of wide bandgap semiconductor devices, hybrid circuit topologies may be used for implementing the converter. Such a hybrid circuit topology combines wide bandgap semiconductor devices, in particular wide bandgap semiconductor switches, with Si based semiconductor devices, in particular Si based semiconductor switches, in order to make use of the benefits of each of them.

In an implementation form of the first aspect, the switches of the first circuit part are wide bandgap semiconductor switches and the switches of the second circuit part are silicon semiconductor switches. This results in a hybrid circuit topology of the converter, in particular a hybrid silicon and wide bandgap semiconductor material (e.g. SiC and/or GaN) device based converter topology. For example, a hybrid silicon and Si/SiC device based converter may improve the performance, especially in terms of power density and efficiency, 10 compared to a converter based only on Si devices at significantly lower cost compared to a converter based only on SiC devices.

An additional characteristic of wide bandgap semiconductor materials is the capability to operate at high temperatures, largely exceeding temperatures at which Si semiconductor devices are configured to operate at.

In an implementation form of the first aspect, the converter is configured to perform the power conversion by performing the first switching operation of the first circuit part and the second switching operation of the second circuit part.

The converter may be configured to perform the power conversion such that a switching of the switches of the first circuit part causes an electrical power loss that is greater than an electrical power loss caused by a switching of the switches of the second circuit part, when the power conversion is performed. The converter may be configured to perform the power conversion such that a switching activity of the switches of the first circuit part is greater than a switching activity of the switches of the second circuit part, when the power conversion is performed.

A controller of the converter may be configured to control, for the power conversion, the switches of the converter such that a switching of the switches of the first circuit part causes an electrical power loss that is greater than an electrical power loss caused by a switching of the switches of the second circuit part, when the power conversion is performed. The controller of the converter may be configured to control, for the power conversion, the switches of the converter such that the first switching operation of the first circuit part and the second switching operation of the second circuit part are performed. The controller of the converter may be configured to control, for the power conversion, the switches of the first circuit part 10 and second circuit part such that a switching activity of the switches of the first circuit part is greater than a switching activity of the switches of the second circuit part.

In an implementation form of the first aspect, the converter comprises a first input terminal and a second input terminal for receiving a voltage, and an output terminal for providing an output voltage. The first input terminal is electrically connected via a first series connection of two switches to the output terminal. The second input terminal is electrically connected via a second series connection of two switches to the output terminal. The first circuit part comprises a first switch of the first series connection and a first switch of the second series connection, wherein the first switch of the first series connection is electrically connected to the first input terminal and the first switch of the second series connection is electrically connected to the second input terminal. The second circuit part comprises a second switch of the first series connection and a second switch of the second series connection, wherein the second switch of the first series connection and the second switch of the second series connection are electrically connected to the output terminal.

That is, the two or more switches of the first circuit part may comprise or correspond to the first switch of the first series connection of two switches and the first switch of the second series connection of two switches. The two or more switches of the second circuit part may comprise or correspond to the second switch of the first series connection of two switches and the second switch of the second series connection of two switches.

In an implementation form of the first aspect, the converter is configured to perform the power conversion such that a switching of the first switch of the first series connection and the first switch of the second series connection causes a greater electrical power loss compared to a switching of the second switch of the first series connection and the second switch of the second series connection, when the power conversion is performed.

The converter may be configured to perform the power conversion such that a switching activity of the first switch of the first series connection and the first switch of the second series connection is greater than a switching activity of the second switch of the first series connection and the second switch of the second series connection, when the power conversion is performed.

A controller of the converter may be configured to control, for the power conversion, the switches of the first circuit part and second circuit part such that a switching of the first switch of the first series connection and the first switch of the second series connection causes a greater electrical power loss compared to a switching of the second switch of the first series connection and the second switch of the second series connection. The controller of the converter may be configured to control, for the power conversion, the switches of the first circuit part and second circuit part such that a switching activity of the first switch of the first series connection and the first switch of the second series connection is greater than a switching activity of the second switch of the first series connection and the second switch of the second series connection.

In an implementation form of the first aspect, the converter comprises a third input terminal.

The third input terminal is electrically connected via a bidirectional switch to the output terminal and the second circuit part comprises the bidirectional switch.

That is, the two or more switches of the second circuit part may comprise or correspond to the second switch of the first series connection of two switches, the second switch of the second series connection of two switches, and the bidirectional switch.

Thus, this implementation form allows implementing a simple converter circuit with a T configuration.

In an implementation form of the first aspect, the converter is configured to perform the power conversion such that a switching of the first switch of the first series connection and the first switch of the second series connection causes a greater electrical power loss compared to a switching of the second switch of the first series connection, the second switch of the second series connection and the bidirectional switch, when the power conversion is performed.

The converter may be configured to perform the power conversion such that a switching activity of the first switch of the first series connection and the first switch of the second series connection is greater than a switching activity of the second switch of the first series connection, the second switch of the second series connection and the bidirectional switch, when the power conversion is performed.

A controller of the converter may be configured to control, for the power conversion, the switches of the first circuit part and second circuit part such that a switching of the first switch of the first series connection and the first switch of the second series connection causes a greater electrical power loss compared to a switching of the second switch of the first series connection, the second switch of the second series connection and the bidirectional switch. The controller of the converter may be configured to control, for the power conversion, the switches of the first circuit part and second circuit part such that a switching activity of the first switch of the first series connection and the first switch of the second series connection is greater than a switching activity of the second switch of the first series connection, the second switch of the second series connection and the bidirectional switch.

In an implementation form of the first aspect, the converter comprising a first diode and a second diode. The anode of the first diode is electrically connected to the third input terminal and the cathode of the first diode is electrically connected to a connection node between the first switch and the second switch of the first series connection. The cathode of the second diode is electrically connected to the third input terminal and the anode of the second diode is electrically connected to a connection node between the first switch and the second switch of the second series connection. The first circuit part comprises the first diode and the second diode.

The first diode and the second diode each may be a Schottky barrier diode (SBD). These two diodes may be referred to as clamping diodes.

The two diodes have the advantage that they allow a commutation between the first switch of the first series connection and the first diode as well as between the first switch of the second series connection and the second diode taking place inside the same circuit part, namely the first circuit part, of the converter and benefiting for low values of commutation loop inductances that the first circuit part, in particular the packaging of the first circuit part, will present.

The two or more switches of the first circuit part may comprise or correspond to the first switch of the first series connection of two switches, the first switch of the second series connection of two switches, the first diode and the second diode.

The term "uncontrolled semiconductor switch" may be used as a synonym for the term "diode".

The term "controlled semiconductor switch" may refer to a semiconductor switch comprising a control terminal, such as a transistor, a thyristor, triode AC (TRIAC) etc. The first and second switch of the first series connection and the first and second switch of the second series connection may be controlled semiconductor switches. The first and second switch of the first series connection and the first and second switch of the second series connection may be transistors, such as insulated-gate bipolar transistors (IGBTs), field-effect transistors (FETs), metal-oxide-semiconductor FETs (MOSFETs), bipolar junction transistors (BJTs) and/or junction gate FETs (JFETs). The term "diode" may refer to a semiconductor switch (without a control terminal) that allows only a unidirectional current flow, that is a current flow in only one direction, such as a p-n semiconductor diode, a pin diode, a Schottky diode, an intrinsic body diode of a respective device/transistor.

The first switch of the first series connection and the first switch of the second series connection each may be a MOSFET. The second switch of the first series connection and the second switch of the second series connection each may be an IGBT, optional with a diode connected in anti-parallel.

The bidirectional switch is a bidirectional semiconductor switch configured to control current flow in two directions. Thus, the bidirectional semiconductor switch may also be referred to as bidirectional control switch (BCS). A bidirectional semiconductor switch may be implemented by one or more controlled semiconductor switches and optionally one or more diodes. In particular, the one or more controlled semiconductor switches of a bidirectional semiconductor switch may be one or more transistors, such as one or more IGBTs, one or more FETs, one or more MOSFETs, one or more BJTs and/or one or more JFETs. The bidirectional switch may comprise 10 or correspond to two IGBTs electrically connected at the source terminals to each other, wherein a diode is connected in anti-parallel to each IGBT.

In an implementation form of the first aspect, the converter is configured to perform the power conversion such that a first commutation loop and a second commutation loop are formed, when the power conversion is performed. The first commutation loop comprises the first switch of the first series connection and the first diode, and the second commutation loop comprises the first switch of the second series connection and the second diode.

A controller of the converter may be configured to control, for the power conversion, the switches of the first circuit part and second circuit part such that the first commutation loop, comprising the first switch of the first series connection and the first diode, is formed and the second commutation loop, comprising the first switch of the second series connection and the second diode, is formed.

In an implementation form of the first aspect, the converter comprises a third switch and a fourth switch. The third switch is electrically connected in parallel to the first series connection.

The fourth switch is electrically connected in parallel to the second series connection. The second circuit part comprises the third switch and the fourth switch.

The third switch and the fourth switch may be transistors, such IGBTs, FETs, MOSFETs, BJTs and/or JFETs. In particular, the third switch and the fourth switch each may be an IGBT, with a diode connected in anti-parallel. The above description with respect to the switches of the first series connection and the second series connection may be correspondingly valid for the third and fourth switch.

The two or more switches of the second circuit part may comprise or correspond to the second switch of the first series connection, the second switch of the second series connection, the bidirectional switch, the third switch and the fourth switches.

In an implementation form of the first aspect, the converter is configured to perform the power conversion such that a switching of the first switch of the first series connection and the first switch of the second series connection causes a greater electrical power loss compared to a switching of the second switch of the first series connection, the second switch of the second series connection, the bidirectional switch, the third switch and the fourth switch, when the power conversion is performed.

The converter may be configured to perform the power conversion such that the third switch and the fourth switch are configured to improve conduction between the input terminals and the output terminal by bypassing the first series connection and the second series connection respectively. The purpose of the aforementioned is reducing overall electrical power loss and improving efficiency.

A controller of the converter may be configured to control, for the power conversion, the switches of the first circuit part and second circuit part such that a switching of the first switch of the first series connection and the first switch of the second series connection causes a greater electrical power loss compared to a switching of the second switch of the first series connection, the second switch of the second series connection, the bidirectional switch, the third switch and the fourth switch.

In an implementation form of the first aspect, the converter comprises a first capacitor and a second capacitor. The first input terminal is electrically connected via the first capacitor to the third input terminal. The second input terminal is electrically connected via the second capacitor to the third input terminal. The first circuit part comprises the first capacitor and the second capacitor.

In an implementation form of the first aspect, the converter is configured to perform the power conversion such that a commutation loop is formed by the first switch of the first series connection and the first capacitor and a commutation loop is formed by the first switch of the second series connection and the second capacitor, when the power conversion is performed.

A controller of the converter may be configured to control, for the power conversion, the switches of the first circuit part and second circuit part such that a commutation loop is formed by the first switch of the first series connection and the first capacitor and a commutation loop is formed by the first switch of the second series connection and the second capacitor.

In order to achieve the converter according to the first aspect of the disclosure, some or all of the implementation forms and optional features of the first aspect, as described above, may be combined with each other.

A second aspect of the disclosure provides a three-phase converter arrangement comprising three phase legs for performing power conversion. At least one phase leg of the three phase legs comprises or corresponds to a converter according to the first aspect or any of its implementation forms, as described above.

In an implementation form of the second aspect, each phase leg of the three phase legs comprises or corresponds to a converter according to the first aspect or any of its implementation forms, as described above.

The three-phase converter arrangement may correspond to a DC-to-AC converter arrangement (also known as three-phase DC-to-AC inverter arrangement). In this case, each phase leg of the three phase legs may comprise or correspond to a DC-to-AC converter. Alternatively, the three-phase converter arrangement may correspond to an AC-to-DC converter arrangement. In this case, each phase leg of the three phase legs may comprise or correspond to an AC-to-DC converter.

The three-phase converter arrangement of the second aspect and its implementation forms and optional features achieve the same advantages as the converter of the first aspect and its respective implementation forms and respective optional features.

The implementation forms and optional features of the converter according to the first aspect are correspondingly valid for the three-phase converter arrangement according to the second aspect. That is, the description of the converter according to the first aspect is correspondingly valid for the three-phase converter arrangement according to the second aspect.

In order to achieve the three-phase converter arrangement according to the second aspect of the disclosure, some or all of the implementation forms and optional features of the second aspect, as described above, may be combined with each other.

A third aspect of the disclosure provides a method for packaging a converter for power conversion, the converter comprising a first circuit part and a second circuit part that are electrically connected with each other. Each circuit part of the first circuit part and the second circuit part comprises two or more switches configured to be switched for the power conversion, wherein the switches are semiconductor switches. The two or more switches of the first circuit part are configured for a first switching operation of the first circuit part. The two or more switches of the second circuit part are configured for a second switching operation of the second circuit part. The first switching operation causes a greater electrical power loss compared to the second switching operation. The method comprises differently packaging the first circuit part and the second circuit part such that the first circuit part is configured to operate at a higher operating temperature compared to the second circuit part.

The converter (being packaged) may be a converter according to the first aspect or any of its implementation forms, as described above.

In an implementation form of the third aspect, the method comprises packaging the first circuit part and the second circuit part such that a first package material packages the first circuit part and a second package material packages the second circuit part, wherein the first package material is suitable for a higher operating temperature compared to the second package material.

That is, differently packaging the first circuit part and the second circuit part may comprise or correspond to packaging the first circuit part and the second circuit part such that a first package material packages the first circuit part and a second package material packages the second circuit part, wherein the first package material is suitable for a higher operating temperature compared to the second package material.

In an implementation form of the third aspect, the method comprises packaging the first circuit part in a first package comprising the first package material and packaging the second circuit part in a second package comprising the second package material.

That is, differently packaging the first circuit part and the second circuit part may comprise or correspond to packaging the first circuit part in a first package comprising the first package material and packaging the second circuit part in a second package comprising the second package material.

In an implementation form of the third aspect, the method comprises packaging the first circuit part and the second circuit part such that the first circuit part and the second circuit part are differently bonded.

That is, differently packaging the first circuit part and the second circuit part may comprise or correspond to packaging the first circuit part and the second circuit part such that the first circuit part and the second circuit part are differently bonded. In other words, the first circuit part and the second circuit part may be differently bonded.

In an implementation form of the first aspect, the method comprises bonding the first circuit part according to at least one sintering technique.

That is, differently packaging the first circuit part and the second circuit part may comprise or correspond to bonding the first circuit part according to at least one sintering technique.

The method of the third aspect and its implementation forms and optional features achieve the same advantages as the converter of the first aspect and its respective implementation forms and respective optional features.

The implementation forms and optional features of the converter according to the first aspect are correspondingly valid for the method according to the third aspect. That is, the description of the converter according to the first aspect is correspondingly valid for the method of the third aspect. In particular, the description with regard to the packaging of the converter according to implementation forms of the first aspect is correspondingly valid for the method of the third aspect.

In order to achieve the method according to the third aspect of the disclosure, some or all of the implementation forms and optional features of the third aspect, as described above, may be combined with each other.

All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings.

FIG. 8 shows an example of a method according to the disclosure for packaging a converter.

In the FIGS., corresponding elements are labeled with the same reference sign.

DESCRIPTION OF EMBODIMENTS

Figure 1:
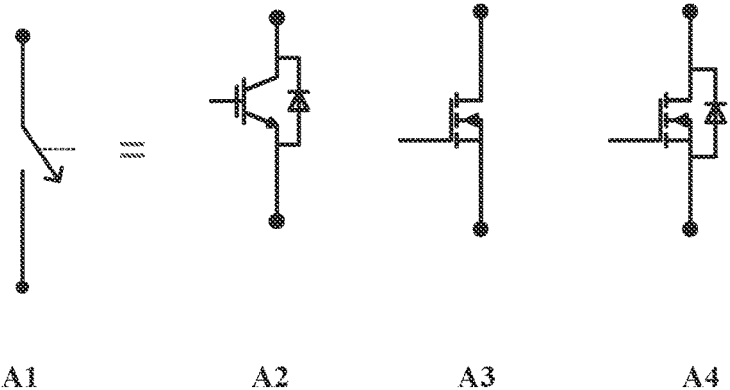
FIG. 1 shows examples of unidirectional semiconductor switches (A1, A2, A3, and A4) and examples of bidirectional semiconductor switches (B1, B2, B3, B4, and B5)
Figure 1:
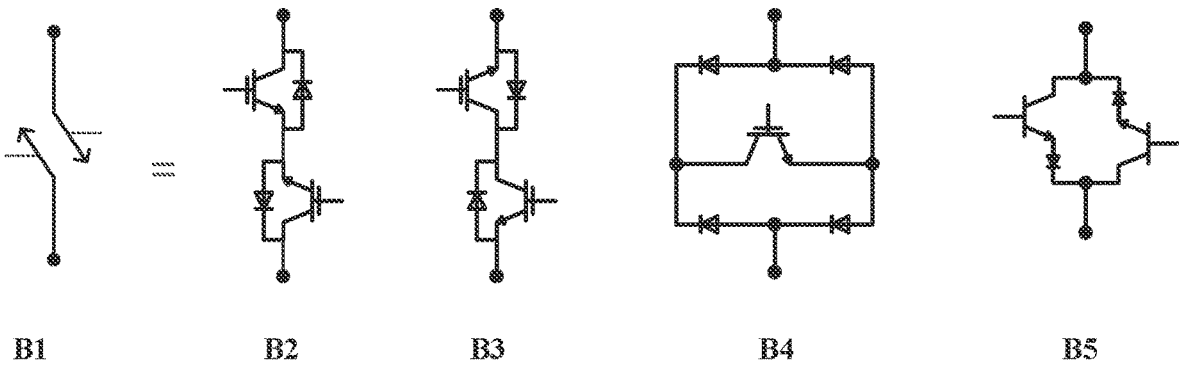

FIG. 1 shows examples of unidirectional semiconductor switches (A1, A2, A3, and A4) and examples of bidirectional semiconductor switches (B1, B2, B3, B4, and B5).

A unidirectional semiconductor switch is configured to control current flow in only one direction. Thus, the unidirectional semiconductor switch may also be referred to as unidirectional control switch (UCS). A bidirectional semiconductor switch is configured to control current flow in two directions. Thus, the bidirectional semiconductor switch may also be referred to as BCS.

A1 shows a symbol used for a UCS respectively a unidirectional semiconductor switch. A2-A4 show three possible implementations of a unidirectional semiconductor switch, wherein A2 shows an IGBT with a diode connected in anti-parallel, A3 shows a MOSFET, and A4 shows a MOSFET with a diode connected in anti-parallel.

B1 shows a symbol used for a BCS respectively a bidirectional semiconductor switch. B2-B5 show various possible implementations of a bidirectional semiconductor switch. The configurations shown in B2-B3 are referred to as anti-serial (back-to-back) bidirectional semiconductor switches implemented by two IGBTs with common emitter (as shown in B2) or with common collector (as shown in B3). The configuration, shown in B4 is referred to as bidirectional semiconductor switch with a diode bridge, wherein the bidirectional semiconductor switch may be formed by a diode bridge and an IGBT. The configuration, shown in B5, may be referred to as antiparallel bidirectional semiconductor switch using reverse blocking IGBTs (RB-IGBTs).

Figure 2A:
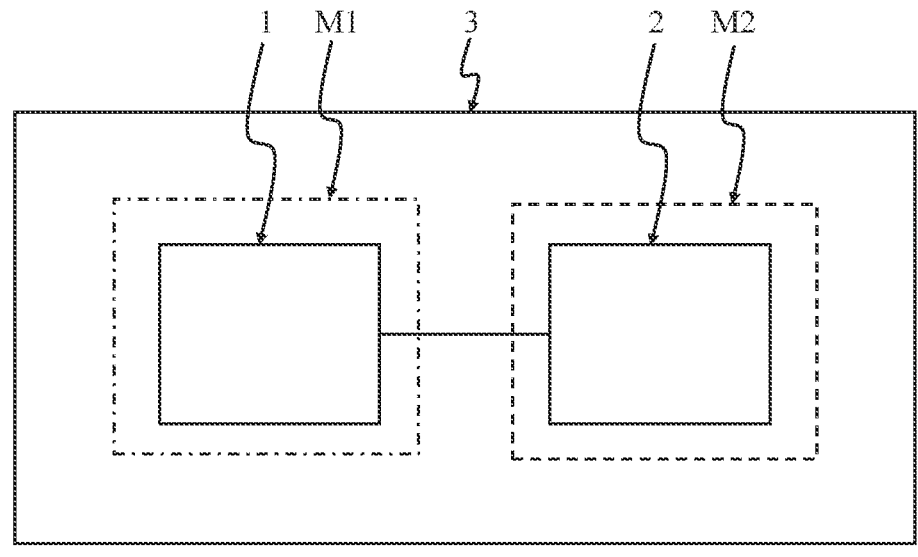
FIGS. 2A-2B each show an example of a converter according to the disclosure.
Figure 2B:
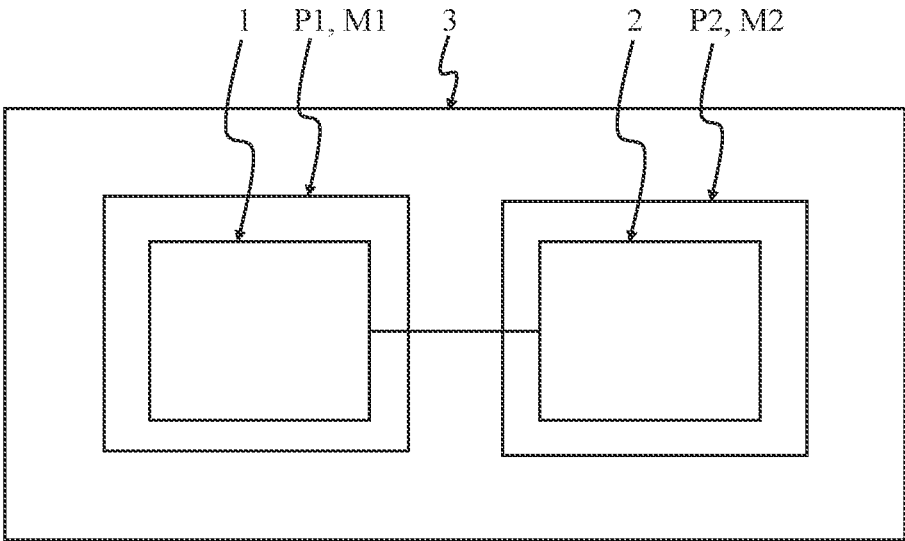

FIGS. 2A-2B each show an example of a converter according to an embodiment of the disclosure.

The converter 3 of FIG. 2A is a converter for power conversion comprising a first circuit part 1 and a second circuit part 2 that are electrically connected with each other. Each circuit part of the first circuit part 1 and the second circuit part 2 comprises two or more switches configured to be switched for the power conversion (not shown in FIG. 2A), wherein the switches are semiconductor switches. The two or more switches of the first circuit part 1 are configured for a first switching operation of the first circuit part. The two or more switches of the second circuit part 2 are configured for a second switching operation of the second circuit part. The first switching operation causes a greater electrical power loss compared to the second switching operation. The first circuit part 1 and the second circuit part 2 are configured such that the first circuit part 1 is configured to operate at a higher operating temperature compared to the second circuit part 2.

As indicated in FIG. 2A, the first circuit part 1 and the second circuit part 2 may be differently packaged such that the first circuit part 1 is configured to operate at a higher operating temperature compared to the second circuit part 2. In particular, the first circuit part 1 and the second circuit part 2 are packaged such that a first package material M1 packages the first circuit part 1 and a second package material M2 packages the second circuit part 2. The first package material M1 is suitable for a higher operating temperature compared to the second package material M2.

The converter of FIG. 2B corresponds to the converter of FIG. 2B. Therefore, the above description of the converter of FIG. 2A is also valid for the converter of FIG. 2B, and in the following, mainly an optional feature of the converter of FIG. 2B is described.

As indicated in FIG. 2B, the first circuit part 1 of the converter 3 may be packaged in a first package P1 comprising the first package material M1 and the second circuit part 2 may be packaged in a second package P2 comprising the second package material M2. That is, the first circuit part 1 and the second circuit part 2 may be packaged in two separate modules. The first circuit part 1 may be packaged in a first module using the first package material M1. The first module comprises or corresponds to the first package P1. The second circuit part 2 may be packaged in a second module using the second package material M2. The second module comprises or corresponds to the second package P2.

In addition or alternatively with regard to the embodiments of packaging shown in FIGS. 2A-2B, the first circuit part 1 and the second circuit part 2 may be packaged such that the first circuit part 1 and the second circuit part 2 are differently bonded. In particular, the first circuit part 1 and the second circuit part 2 may be packaged such that the first circuit part 1 is bonded according to a first bonding technique and the second circuit part 2 is bonded according to a second bonding technique, wherein the first bonding technique is suitable for a higher operating temperature compared to the second bonding technique (not shown in FIGS. 2A-2B). The first circuit part 1 may be bonded according to at least one sintering technique. The first circuit part 1 may be bonded according to a double sided sintering technique, a silver sintering technique or a combination thereof.

As an alternative to the embodiment of FIG. 2B, the first circuit part 1 and the second circuit part 2 may be packaged in a single package (respectively module), wherein the first circuit part 1 is packaged using the first package material M1 and the second circuit part 2 is packaged using the second package material M2. That is the converter 3 may be packaged in a single package. In particular, the single package may comprise an increased cooling in a zone of the package, where the first circuit part 1 is arranged. This embodiment has an advantage in that commutation loops occurring in the converter 3 during operation of the converter 3 are kept inside a single package, enabling for lower commutation loop inductances and achieving an enhanced commutation. The above description of FIG. 2A and of the different bonding is correspondingly valid for the optional alternative of the single package for packaging the first and second circuit part of the converter 3.

The converters of FIG. 2A and FIG. 2B achieve the advantages described above with respect to the converter of the first aspect and its respective implementation forms. The above description of the converter of the first aspect is correspondingly valid for the converters of FIG. 2A and FIG. 2B.

Figure 3:
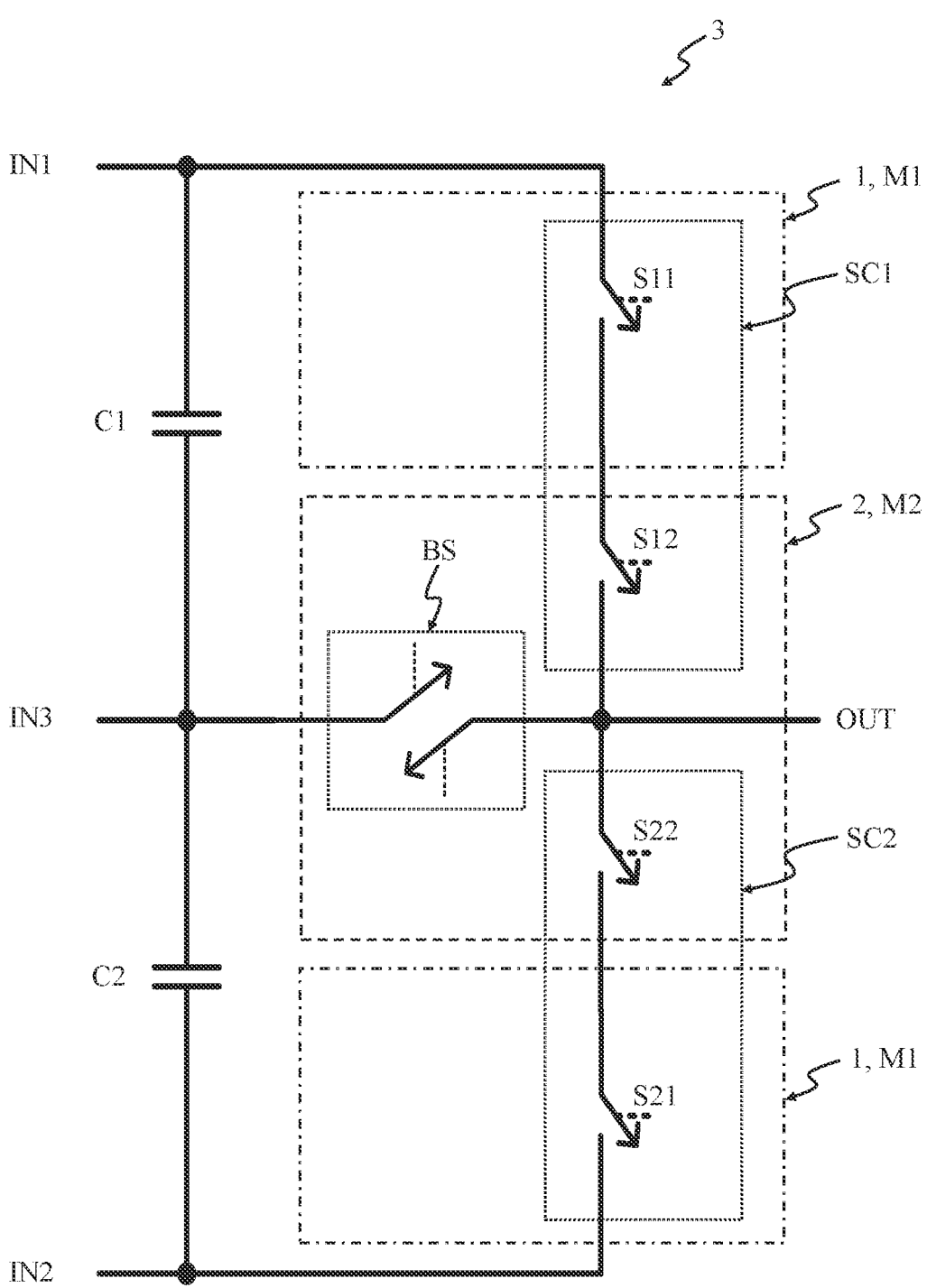
FIGS. 3-6 each show an example of a converter according to the disclosure.

FIG. 3 shows an example of a converter according to an embodiment of the disclosure. In particular, FIG. 3 shows an example of an implementation form of the converters according to FIG. 2A and FIG. 2B. Therefore, the above description of the converters of FIG. 2A and FIG. 2B is correspondingly valid for the converter of FIG. 3. In the following reference is made to the converters of FIG. 2A and FIG. 2B.

As shown in FIG. 3, the converter 3 comprises a first input terminal IN1 and a second input terminal IN2 for receiving a voltage, a third input terminal IN3 and an output terminal OUT for providing an output voltage. The third input terminal IN3 may be electrically connected to neutral potential, as exemplarily described below with respect to FIG. 4. Optionally, the third input terminal IN3 may be electrically connected to ground. The converter 3 further comprises a first series connection SC1 of two switches S11, S12, a second series connection SC2 of two switches S21, S22 and a bidirectional switch BS. The switches of the converter 3 (i.e. the switches S11, S12, S21, S22 and BS) are semiconductor switches. Furthermore, the converter 3 may comprise two optional capacitors C1, C2.

As shown in FIG. 3, the first input terminal IN1 is electrically connected via the first series connection SC1 of the two switches S11, S12 to the output terminal OUT. The second input terminal IN2 is electrically connected via the second series connection SC2 of the two switches S21, S22 to the output terminal OUT. The third input terminal IN3 is electrically connected via the bidirectional switch BS to the output terminal OUT. The first input terminal IN1 is electrically connected via a first capacitor C1 of the two optional capacitors C1, C2 to the third input terminal IN3. The second input terminal IN2 is electrically connected via a second capacitor C2 of the two optional capacitors C1, C2 to the third input terminal IN3.

The first circuit part 1 comprises a first switch S11 of the first series connection SC1 and a first switch S21 of the second series connection SC2. The first switch S11 of the first series connection SC1 is electrically connected to the first input terminal IN1 and the first switch S21 of the second series connection SC2 is electrically connected to the second input terminal IN2. The first circuit part 1 may comprise the two optional capacitors C1, C2 (not indicated in FIG. 3). The second circuit part 2 comprises a second switch S12 of the first series connection SC1 and a second switch S22 of the second series connection S22. The second switch 12 of the first series connection SC1 and the second switch S22 of the second series connection SC2 are electrically connected to the output terminal OUT. In addition, the second circuit part 2 comprises the bidirectional switch BS.

The converter 3 is configured to perform the power conversion by performing the first switching operation of the first circuit part 1 and the second switching operation of the second circuit part 2. In particular, the converter 3 is configured to perform the power conversion such that a switching of the first switch S11 of the first series connection SC1 and the first switch S21 of the second series connection SC2 causes a greater electrical power loss compared to a switching of the second switch S12 of the first series connection SC1, the second switch S22 of the second series connection SC2 and the bidirectional switch BS, when the power conversion is performed.

The converter 3 may comprise a controller for controlling the switching of the switches of the converter 3 and thus, the power conversion by the converter 3 (not shown in FIG. 3). The controller of the converter 3 may be configured to switch the switches of the converter 3 as described above.

According to an embodiment, the switches of the first circuit part 1, i.e. the switches S11 and S21, are wide bandgap semiconductor switches, and the switches of the second circuit part 2, i.e. the switches S12, S22 and BS, are silicon semiconductor switches. Optionally, the switches of the first circuit part 1 may be implemented by wide bandgap MOSFETs, such as SiC MOSFETs, and the switches of the second circuit part 2 may be implemented by Si IGBTs, as exemplarily shown in FIG. 6. For example, the two switches S12 and S22 of the second circuit part 2 may each be implemented by a Si IGBT, and the bidirectional switch BS may be implemented by two Si IGBTs connected in series, as exemplarily shown in FIG. 6.

The converter 3 of FIG. 3 is configured for a DC power to AC power conversion and, thus, represents a DC-to-AC converter. The switches S11 and S21 of the first circuit part 1 (e.g. the wide bandgap MOSFETs) are arranged in the external positions of the series connection of switches formed by the first series connection SC1 and second series connection SC2 connected in series to each other and are switched more frequently during regular DC-to-AC converter operation. Thus, the converter 3 may take advantage of the superior switching 10 performance of the wide bandgap semiconductor material in the switches S11 and S21 of the first circuit part 1, when these switches S11, S21 are implemented by at least one wide bandgap semiconductor material.

The converter 3 may be used for applications characterized by relatively large modulation indexes and high power factors, such as applications where a PV device is connected to the grid. In such cases, the bidirectional switch BS, in particular the semiconductor switches forming the bidirectional switch, are lightly loaded, and carry relatively low switching losses. Therefore, the bidirectional switch BS may be implemented with Si based semiconductor devices. This reduces costs because Si based semiconductor devices are cheaper than semiconductor devices that are based on wide bandgap semiconductor material.

Since the switches S12 and S22 of the second circuit part 2 are less frequently switched during regular DC-to-AC converter operation, these switches S12 and S22 may each be implemented by a Si IGBT optimized for conduction. This contributes to an overall low power loss. In addition, this reduces costs with respect to an implementation using wide bandgap semiconductor switches.

As indicated in FIG. 3, the switches of the first circuit part 1 (switches S11 and S21), are packaged with the same package material, namely the first package material M1. The switches of the second circuit part 2 (switches S12, S22 and BS) are packaged with the same package material different to the one used for the first circuit part 1, namely the second package material M2.

As outlined already above, the wide bandgap semiconductor material, such as SiC, is suitable for higher temperatures compared to silicon. Therefore, the operating temperature of the first circuit part 1 may be higher than the operating temperature of the second circuit part 2. A higher operating temperature increases the power the semiconductor devices may effectively process, increasing power density and lowering the cost per kilowatt (KW).

The converter topology of the converter 3 shown in FIG. 3 allows a simple circuit with a T configuration. Using low voltage wide bandgap semiconductor switches, such as low voltage wide bandgap MOSFETs (e.g. SiC MOSFETs), for implementing the switches S11 and S21 of the first circuit part 1 allows increasing the voltage operation range of the converter 3. Moreover, the switches S11 and S21 of the first circuit part 1, when implemented by wide bandgap semiconductor switches, may be used as the primary switching device during converter operation of the converter 3. This may assist in reducing switching losses.

Packaging the first circuit part 1 by the first package material M1 and packaging the second circuit part 2 by the second package material M2, enables the switches of the first circuit part 1 to operate at higher temperatures. At the same time, the costs for implementing the converter 3 is reduced compared to the case of using only the first package material M1 for packaging the converter 3 to allow the switches of the first circuit part 1 to operate at higher temperatures. Namely, the first package material M1 suitable for higher operating temperatures compared to the second package material M2 is more expensive than the second package material M2.

For further details on the converter 3 shown in FIG. 3, reference is made to the above description of the converter according to the first aspect. That is, the above description of the converter of the first aspect is correspondingly valid for the converter of FIG. 3.

Figure 4:
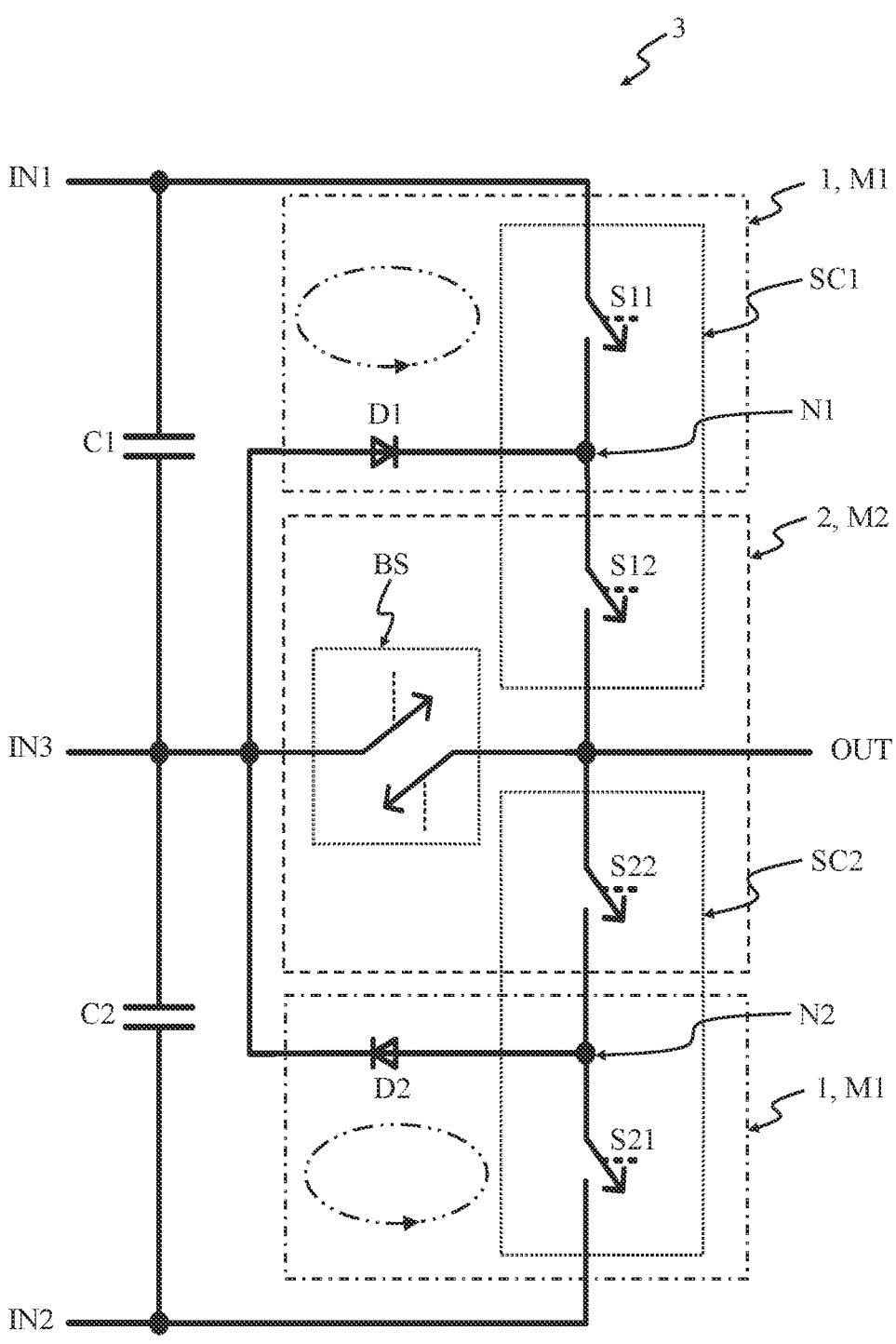

FIG. 4 shows an example of a converter according to an embodiment of the disclosure. In particular, the converter of FIG. 4 corresponds to the converter of FIG. 3, wherein the converter of FIG. 4 comprises additional optional features. Therefore, the above description of the converters of FIGS. 2A-2B and 3 is correspondingly valid for the converter of FIG. 4. In the following, mainly the additional features of the converter of FIG. 4 are described.

As shown in FIG. 4, the converter 3 comprises a first diode D1 and a second diode D2 (in addition to the electric elements comprised by the converter of FIG. 3). The anode of the first diode D1 is electrically connected to the third input terminal IN3 and the cathode of the first diode D1 is electrically connected to a connection node N1 between the first switch S11 and the second switch S12 of the first series connection SC1. The cathode of the second diode D2 is electrically connected to the third input terminal IN3 and the anode of the second diode D2 is electrically connected to a connection node N2 between the first switch S21 and the second switch S22 of the second series connection SC2. The first circuit part 1 comprises the first diode D1 and the second diode D2.

The first diode D1 and the second diode D2 each may be a SBD. In particular, the two diodes D1 and D2 may be implemented by wide bandgap SBDs, for example SiC SBDs. These two diodes D1 and D2 form clamping branches.

For the following description, it is assumed by way of example that a positive DC voltage is provided to the first input terminal IN1 and a negative DC voltage is provided to the second input terminal IN2. The third input terminal IN3 is maintained at mid voltage of the positive DC voltage at the first input terminal IN1 and the negative DC voltage at the second input terminal IN2. The third input terminal IN3 can be referred to as neutral terminal. In case of converter operation of the converter 3 at high power factor, which is characteristic of PV power conversion, most commutation from the positive voltage to neutral potential at the third input terminal IN3, and from the negative voltage to neutral potential at the third input terminal IN3 occur in the commutation loops described in the following. These commutation loops are shown in FIG. 4 by the two dot dashed circles with an arrow. A first commutation loop comprises the first switch 11 of the first series connection SC1 and the first diode D1. A second commutation loop comprises the first switch S21 of the second series connection SC2 and the second diode D2. The optional first capacitor C1 may be part of the first commutation loop. The optional second capacitor C2 may be part of the second commutation loop.

The topology of the converter 3 of FIG. 4 optimizes those commutations in terms of the circuit due to the low number of elements (only two switches and two diodes) involved in the process, as indicated in FIG. 4. Moreover, the proposed package concept, i.e. packaging the first circuit part 1 by one package material (the first package material M1), allows keeping the commutation loops inside the same power module. This also contributes to an optimal switching of the semiconductor devices involved in the commutation loops, i.e. the two switches S11 and S21 and the two diodes D1 and D2 of the first circuit part 1. The commutation loops may be confined to either the portion between the first input terminal IN1 and the third input terminal IN3 of the converter 3 (positive portion of the converter 3) or the portion between the second input terminal IN2 and the third input terminal IN3 of the converter 3 (negative portion of the converter 3). Therefore, the length of the commutation loop and value of the commutation loop inductance may be minimized. This helps to optimize the commutation transient behaviour, leading to operation of the converter 3 at increased efficiency.

The converter 3 may take advantage of the superior switching performance of the wide bandgap semiconductor material in the switches S11 and S21 and the diodes D1 and D2 of the first circuit part 1, when these switches S11, S12 and diodes D1 and D2 are implemented by at least one wide bandgap semiconductor material (e.g. as SiC MOSFETs respectively SiC Schottky barrier diodes).

In particular, the use of wide bandgap Schottky barrier diodes (e.g. SiC Schottky barrier diodes) with minimum reverse recovery may help to reduce turn-on losses (switch-on losses) in the switches S11 and S21 of the first circuit part 1, which support the majority of the losses in the converter 3.

The bidirectional switch BS may have the capacity to bypass the two clamping diodes D1 and D2 in the N-state of the converter 3, wherein the N-state corresponds to the state in which the bidirectional switch BS is in the conducting-state. This reduces the current carrying burden from the two diodes D1 and D2. This also reduces the amount of wide bandgap diode chips (e.g. SiC SBD diode chips) for implementing the two diodes D1 and D2, additionally lowering significantly the repetitive surge current requirement of those diodes D1 and D2.

During the operation of the converter 3 for power conversion, the switches S12 and S22 of the second circuit part 2 may be operated without significant involvement in the commutations. Thus, the switches S12 and S22 may each be implemented by a Si IGBT optimized for conduction. This contributes to an overall low power loss of the converter 3. In addition, this reduces costs with respect to an implementation using wide bandgap semiconductor switches.

In case the first circuit part 1 is packaged in a first package comprising the first package material M1 and the second circuit part 2 is packaged in a second package comprising the second package material M2 (not shown in FIG. 4), as described with respect to FIG. 2B, there may be an increased parasitic inductance of the connection (inter-module connection) between the first circuit part 1 and the second circuit part 2. This does not have a negative effect on the commutations described above, because these commutations are only performed in the first circuit part 1 and, thus, within one circuit part (intra-module). Namely, the commutations between the switches S11 and S21 and the diodes D1 and D2 take place inside the same circuit part (e.g. the same module). There is a benefit for low values of commutation loop inductance that the single first package presents. In other words, keeping the commutation loops of the first circuit part 1 inside a single package (e.g. the first package P1), enables for lower commutation loop inductances and achieves an enhanced commutation.

For further details on the converter 3 shown in FIG. 4, reference is made to the above description of the converter according to the first aspect. That is, the above description of the converter of the first aspect is correspondingly valid for the converter of FIG. 4.

Figure 5:
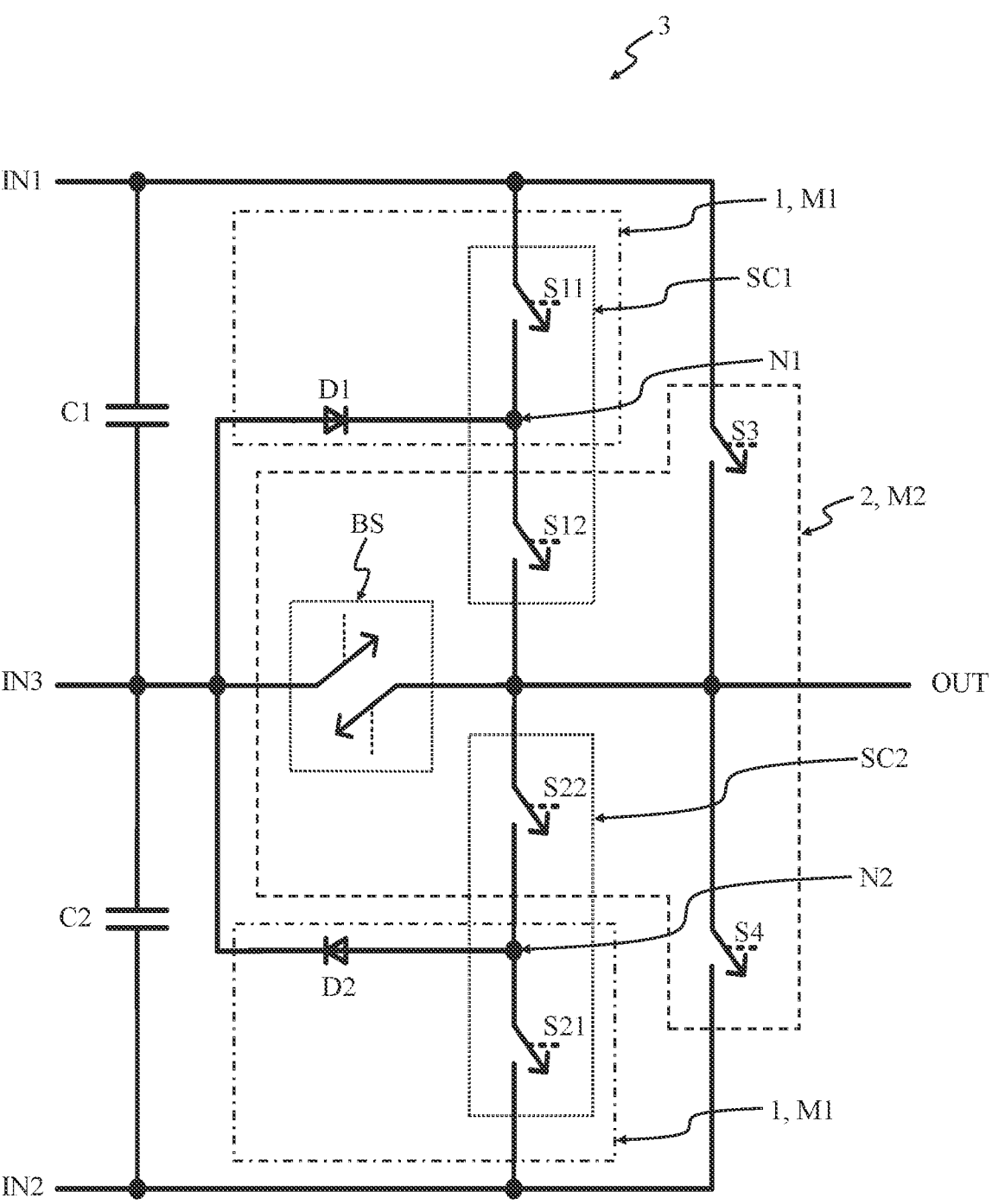

FIG. 5 shows an example of a converter according to an embodiment of the disclosure. In particular, the converter of FIG. 5 corresponds to the converter of FIG. 4, wherein the converter of FIG. 5 comprises additional optional features. Therefore, the above description of the converters of FIG. 2A, FIG. 2B, FIG. 3, and FIG. 4 is correspondingly valid for the converter of FIG. 5. In the following, mainly the additional features of the converter of FIG. 5 are described.

As shown in FIG. 5, the converter 3 comprises a third switch S3 and a fourth switch S4 (in addition to the electric elements comprised by the converter of FIG. 4). The third switch S3 is electrically connected in parallel to the first series connection SC1. The fourth switch S4 is electrically connected in parallel to the second series connection SC2. The second circuit part 2 comprises the third switch S3 and the fourth switch S4. These two switches may be silicon semiconductor switches.

The third switch S3 and the fourth switch S4 are arranged in the converter in order to assist reducing conduction losses. In order to achieve that conduction losses reduction, these additional two switches S3 and S4 are operated such that they are switched between the nonconducting state and the conducting state (that is they open and close), when the series connection SC1 respectively SC2 (respective branch) connected in parallel is conducting. In that way the commutations may be done under zero voltage switching (ZVS) conditions with reduced switching losses. The third switch S3 and the fourth switch S4 may improve conduction between the input terminals and the output terminal of the converter 3 by bypassing the first series connection SC1 and the second series connection SC2, respectively. The purpose of the aforementioned is reducing overall electrical power loss and improving efficiency.

According to an embodiment, the converter of FIG. 5 may not comprise the two diodes D1 and D2. The above description with regard to FIG. 2A, FIG. 2B, FIG. 3, and FIG. 5 is correspondingly valid.

For further details on the converter 3 shown in FIG. 5, reference is made to the above description of the converter according to the first aspect. That is, the above description of the converter of the first aspect is correspondingly valid for the converter of FIG. 5.

Figure 6:

FIG. 6 shows an example of a converter according to an embodiment of the disclosure. In particular, the converter of FIG. 6 corresponds to the converter of FIG. 5, wherein an exemplarily implementation of the elements of the converter 3 is shown. Therefore, the above description of the converter of FIG. 2A, FIG. 2B, FIG. 3, and FIG. 5 is correspondingly valid for the converter of FIG. 6.

As shown in FIG. 6, the first circuit part 1 comprises the first switch S11 of the first series connection SC1, the first switch S21 of the second series connection SC2, the optional first diode D1 and the optional second diode D2. The second circuit part 2 comprises the second switch S12 of the first series connection SC1, the second switch S22 of the second series connection SC2, the bidirectional switch BS, the optional third switch S3 and the optional fourth switch S4.

The semiconductor devices of the first circuit part 1 are implemented by wide bandgap semiconductor devices, such as semiconductor devices based on SiC and/or GaN. In particular, the switches S11 and S21 of the first circuit part 1 are each implemented by a wide bandgap MOSFET, e.g. SiC MOSFET or GaN MOSFET. The optional diodes D1 and D2 of the first circuit part are each implemented by a wide bandgap SBD, e.g. SiC Schottky barrier diode or GaN Schottky barrier diode. This implementation is only by way of example and does not limit the present disclosure. Thus, the semiconductor switches and diodes of the first circuit part 1 may be implemented by different wide bandgap semiconductor switches respectively wide bandgap diodes.

The switches of the second circuit part 2 are implemented by Si IGBTs, wherein the bidirectional switch BS is formed by two Si IGBTs S5 and S6. A diode is connected in antiparallel to each Si IGBT. This implementation is only by way of example and does not limit the present disclosure. Thus, the semiconductor switches of the second circuit part 2 may be implemented by different Si semiconductor switches. In particular, the bidirectional switch (BS) may be implemented differently.

For further details on the converter 3 shown in FIG. 6, reference is made to the above description of the converter according to the first aspect. That is, the above description of the converter of the first aspect is correspondingly valid for the converter of FIG. 6.

Figure 7:
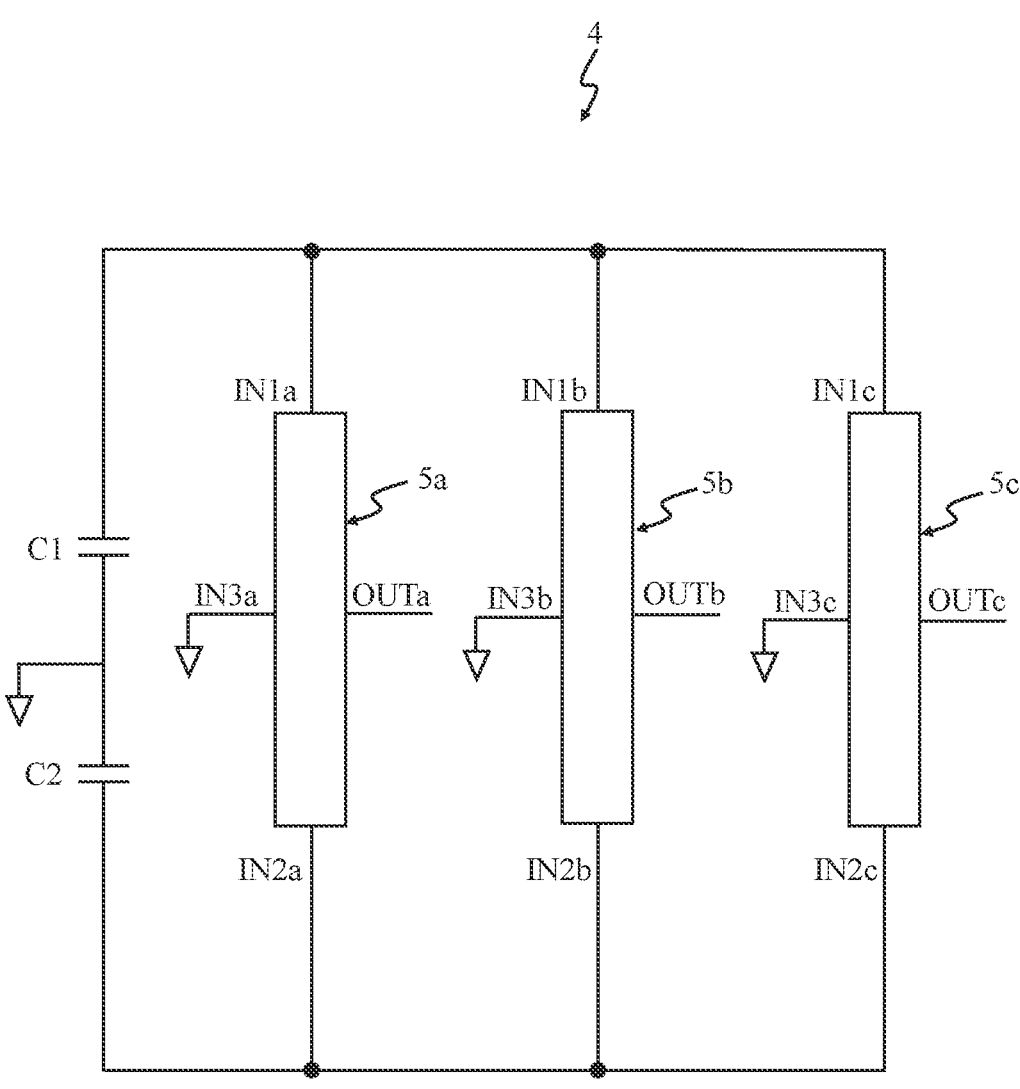
FIG. 7 shows an example of a three-phase converter arrangement according to the disclosure.

FIG. 7 shows and example of a three-phase converter arrangement according to an embodiment of the disclosure.

The three-phase converter arrangement 4 comprise three phase legs 5a, 5b and 5c for performing power conversion. The three phase legs 5a, 5b, and 5c each comprise or correspond to a converter according to any one of the FIGS. 2 to 6, as described above. Therefore, each phase leg comprises a first input terminal IN1a, IN1b respectively IN1c, a second input terminal IN2a, IN2b respectively IN2c, a third input terminal IN3a, IN3b respectively IN3c, and an output terminal OUT1a, OUTb respectively OUTc. The three phase legs 5a, 5b and 5c are connected in parallel to each other. Thus, the three first input terminals IN1a, IN1b and IN1c are connected to each other and the three second input terminals IN2a, IN2b and IN2c are connected to each other.

As shown in FIG. 7, the three-phase converter arrangement 4 comprises two capacitors C1 and C2, where a first capacitor C1 of them is connected on one side to the first input terminals IN1a, IN1b and IN1c of the three phase legs 5a, 5b and 5c and on the other side to neutral potential. A second capacitor C2 of them is connected on one side to the three second input terminals IN2a, IN2b and IN2c and on the other side to neutral potential. Thus, in this case, the converter of each phase leg does not comprise the two optional capacitors C1 and C2 of the converters of FIGS. 3 to 6. Alternatively, the two capacitors C1 and C2 shown in FIG. 7 may correspond to the optional capacitors C1 and C2 of the converter of one phase leg of the three phase legs 5a, 5b and 5c.

For a detailed description of the three phase legs 5a, 5b, 5c of the converter arrangement 4 of FIG. 7 reference is made to the description of FIGS. 2 to 6. In addition, reference is made to the above description of the converter according to the first aspect and the above description of the three-phase converter arrangement according to the second aspect.

FIG. 8 shows an example of a method according to the disclosure for packaging a converter.

The converter comprises a first circuit part and a second circuit part that are electrically connected with each other. Each circuit part of the first circuit part and the second circuit part comprises two or more switches configured to be switched for the power conversion, wherein the switches are semiconductor switches. The two or more switches of the first circuit part are configured for a first switching operation of the first circuit part and the two or more switches of the second circuit part are configured for a second switching operation of the second circuit part, wherein the first switching operation causes a greater electrical power loss compared to the second switching operation. The converter may correspond to a converter according to any one of the FIGS. 2 to 6, as described above. That is, any of the converters of FIGS. 2 to 6 may be packaged according to the method 100 of FIG. 8.

The method 100 of FIG. 8 comprises the step 101 of differently packaging the first circuit part and the second circuit part of the converter such that the first circuit part is configured to operate at a higher operating temperature compared to the second circuit part. In other words, according to the method 100, in particular the method step 101, the first circuit part and the second circuit part of the converter are differently packaged such that the first circuit part is configured to operate at a higher operating temperature compared to the second circuit part. For a detailed description of the method 100 of FIG. 8 reference is made to the above description of the converter according to the first aspect and the above description of the method according to the third aspect.

The embodiments of FIGS. 2 to 6 may be combined in order to form a converter according to the present disclosure. The converters of FIGS. 2 to 6 have the following advantages.

As a result of packaging the converter with the two different package materials, costs may be reduced compared to packaging the converter only with the first package material that enables the function of the first circuit part of the converter. The first package material is more expensive than the second package material, because the first package material is suitable for higher temperatures. In addition, the converter may have higher power density for the reasons outlined above. Further, the converter may have lower cooling requirements due to the temperature difference between the first circuit part packaged by the first package material and the second circuit part packaged by the second package material. The series connection of the switches of the first series connection and second series connection of the converters may lower conduction losses, because each switch of a respective series connection may have a smaller on-resistance compared to using a single switch instead of a series connection of two switches for achieving the same blocking voltage. As a result, low voltage semiconductor devices (switches) may be used enabling a switching operation with a higher frequency which results in lower switching losses and faster switching times.

For solar photo-voltaic applications, the converter topology proposed by the present disclosure may increase the voltage margin with readily available power semiconductor devices. Further, the converter according to the disclosure enables the use of wide bandgap semiconductor devices in a hybrid circuit configuration with Si semiconductor devices, as outlined above.

The present disclosure has been described in conjunction with various embodiments as examples as well as implementations. However, other variations can be understood and effected by those persons skilled in the art and practicing the claimed subject-matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A converter for power conversion, wherein the converter comprises:

a first circuit part comprising first switches configured for power conversion and a first switching operation of the first circuit part, wherein the first switches are first semiconductor switches;

a second circuit part electrically coupled to the first circuit part and comprising second switches configured for the power conversion and a second switching operation of the second circuit part, wherein the second switches are second semiconductor switches, wherein the first switching operation causes a greater electrical power loss than the second switching operation, and wherein the first circuit part operates at a higher operating temperature than the second circuit part;

an output terminal for providing an output voltage;

a first input terminal electrically coupled via a first series connection of the first switches to the output terminal and configured to receive a voltage; and a second input terminal electrically coupled via a second series connection of the second switches to the output terminal and configured to receive the voltage, wherein the first circuit part comprises a first switch of the first series connection and a second switch of the second series connection, wherein the first switch is electrically coupled to the first input terminal, wherein the second switch is electrically coupled to the second input terminal, wherein the second circuit part comprises a third switch of the first series connection and a fourth switch of the second series connection, and wherein the third switch and the fourth switch are electrically coupled to the output terminal.

2. The converter of claim 1, further comprising:
a first package packaging the first circuit part and comprising a first package material; and
a second package packaging the second circuit part and comprising a second package material.

3. The converter of claim 2, wherein the first package material can operate at a higher operating temperature than the second package material.

4. The converter of claim 1, wherein the first circuit part and the second circuit part are packaged such that the first circuit part and the second circuit part are differently bonded.

5. The converter of claim 4, wherein the first circuit part is bonded according to a sintering technique.

6. The converter of claim 1, wherein the first switches are wide bandgap semiconductor switches.

7. The converter of claim 1, wherein the converter is configured to perform the power conversion by performing the first switching operation and the second switching operation.

8. The converter of claim 1, wherein a first switching of the first switch and the second switch causes a greater electrical power loss than a second switching of the third switch and the fourth switch when the converter performs the power conversion.

9. The converter of claim 1, further comprising a third input terminal electrically coupled via a bidirectional switch to the output terminal, wherein the second circuit part comprises the bidirectional switch.

10. The converter of claim 9, wherein a first switching of the first switch and the second switch causes a greater electrical power loss than a second switching of the third switch, the fourth switch, and the bidirectional switch when the converter performs the power conversion.

11. The converter of claim 9, further comprising:
a first diode comprising:
a first anode electrically coupled to the third input terminal; and
a first cathode electrically coupled to a first connection node between the first switch and the third switch; and
a second diode comprising:
a second cathode electrically coupled to the third input terminal; and
a second anode electrically coupled to a second connection node between the first switch and the fourth switch, wherein the first circuit part comprises the first diode and the second diode.

12. The converter of claim 11, wherein the power conversion is configured to form a first commutation loop and a second commutation loop, wherein the first commutation loop comprises the first switch and the first diode, and wherein the second commutation loop comprises the second switch and the second diode.

13. The converter of claim 9, further comprising:
a fifth switch electrically coupled in parallel to the first series connection; and
a sixth switch electrically coupled in parallel to the second series connection, wherein the second circuit part comprises the third switch and the fourth switch.

14. The converter of claim 13, wherein a first switching of the first switch and the second switch causes a greater electrical power loss than a second switching of the second switch, the fourth switch, the bidirectional switch, the fifth switch, and the sixth switch when the converter performs the power conversion.

15. The converter of claim 9, further comprising:
a first capacitor, wherein the first input terminal is electrically coupled via the first capacitor to the third input terminal; and
a second capacitor, wherein the second input terminal is electrically coupled via the second capacitor to the third input terminal, and wherein the first circuit part comprises the first capacitor and the second capacitor.

16. The converter of claim 15, wherein a first commutation loop is formed by the first switch and the first capacitor, and wherein a second commutation loop is formed by the second switch and the second capacitor when the converter performs power conversion.

17. A three-phase converter, comprising:
three phase legs for performing power conversion; and
a converter corresponding to at least one phase leg of the three phase legs and comprising:
a first circuit part comprising first switches configured for power conversion and a first switching operation of the first circuit part, wherein the first switches are first semiconductor switches;
a second circuit part electrically coupled to the first circuit part and comprising second switches configured for the power conversion and a second switching operation of the second circuit part, wherein the second switches are second semiconductor switches, wherein the first switching operation causes a greater electrical power loss than the second switching operation, and wherein the first circuit part operates at a higher operating temperature than the second circuit part;
an output terminal for providing an output voltage;
a first input terminal electrically coupled via a first series connection of the first switches to an output terminal and configured to receive a voltage; and
a second input terminal electrically coupled via a second series connection of the second switches to the output terminal and configured to receive the voltage,
wherein the first circuit part comprises a first switch of the first series connection and a second switch of the second series connection,
wherein the first switch is electrically coupled to the first input terminal,
wherein the second switch is electrically coupled to the second input terminal, wherein the second circuit part comprises a third switch of the first series connection and a fourth switch of the second series connection, and
wherein the third switch and the fourth switch are electrically coupled to the output terminal.

18. The three-phase converter of claim 17, wherein the first circuit part is packaged in a first package comprising a first package material, and wherein the second circuit part is packaged in a second package comprising a second package material.

19. The three-phase converter of claim 18, further comprising a third input terminal electrically coupled via a bidirectional switch to the output terminal, wherein the second circuit part comprises the bidirectional switch.

20. A method comprising:
packaging a first circuit part in a first package comprising a first package material, the first circuit part comprising first switches configured to perform a first switching operation of the first circuit part, wherein the first switches are first semiconductor switches; and packaging a second circuit part in a second package comprising a second package material, the second circuit part comprising second switches configured to perform a second switching operation of the second circuit part, wherein the second switches are second semiconductor switches;

electrically coupling the second circuit part to the first circuit part;

operating the first semiconductor switches such that wherein the first switching operation causes a greater electrical power loss than the second switching operation;

operating the first circuit part at a higher operating temperature than the second circuit part;

electrically coupling a first input terminal to an output terminal via a first series connection of the first switches and configuring the first input terminal to receive a voltage;

electrically coupling a second input terminal to the output terminal via a second series connection of the second switches and configuring the second input terminal to receive the voltage, the first circuit part comprising a first switch of the first series connection and a second switch of the second series connection;

electrically coupling the first switch to the first input terminal;

electrically coupling the second switch to the second input terminal, the second circuit part comprising a third switch of the first series connection and a fourth switch of the second series connection; and electrically coupling the third switch and the fourth switch to the output terminal.

* * * * *